United States Patent [19]

Lassanske

[11] 4,036,075

[45] July 19, 1977

[54] VARIABLE SPEED POWER TRANSMISSION INCLUDING MEANS FOR MINIMIZING BACKLASH

[75] Inventor: George G. Lassanske, Oconomowoc, Wis.

[73] Assignee: Outboard Marine Corporation, Waukegan, Ill.

[21] Appl. No.: 683,625

[22] Filed: May 5, 1976

[51] Int. Cl.² ............................................. F16H 55/18
[52] U.S. Cl. ........................................ 74/409; 74/440
[58] Field of Search .......................... 74/409, 440, 242

[56] References Cited

U.S. PATENT DOCUMENTS

| 2,192,188 | 3/1940 | Green | 74/440 |
| 2,273,784 | 2/1942 | Kahl | 74/440 |

Primary Examiner—Edgar W. Geoghegan
Attorney, Agent, or Firm—Michael, Best & Friedrich

[57] ABSTRACT

Disclosed herein is a V-belt power transmission including a movable sheave member which has a hub and is mounted on the driving portion of an input shaft for common rotary movement and for relative axial movement via first and second axially spaced drive bushings, each having a central aperture which receives the shaft driving portion and having driven surfaces which are drivingly engaged by driving surfaces on the shaft driving portion during rotation of the shaft by a power source. The first drive bushing is affixed to the hub of the movable sheave member and the second drive bushing is connected, either to the hub of the movable sheave member or to the first drive bushing, by means arranged to resiliently urge the second bushing rotationally relative to the first drive bushing so that the driven surfaces of the drive bushings apply a predetermined "locked-up" torque on the shaft driving portion, thereby minimizing backlash between the movable sheave member and the shaft driving portion.

9 Claims, 5 Drawing Figures

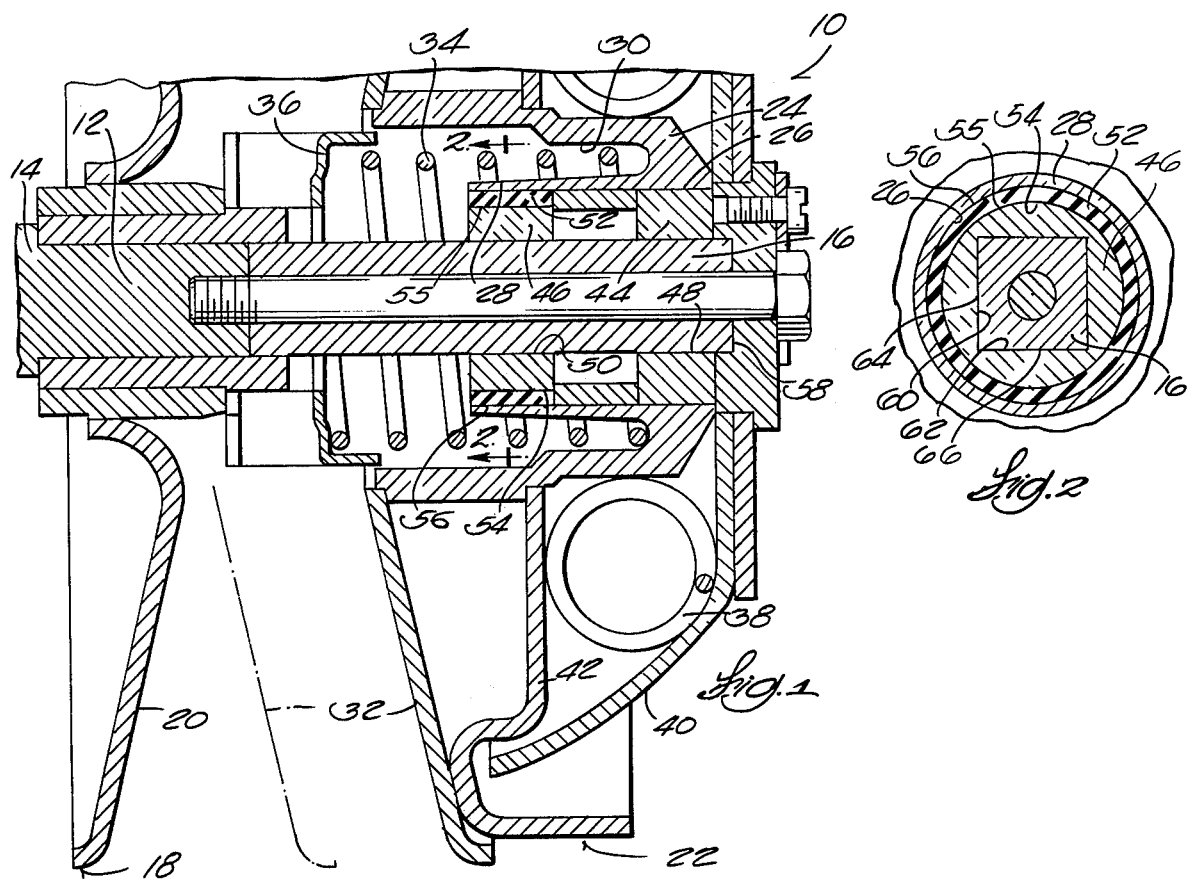
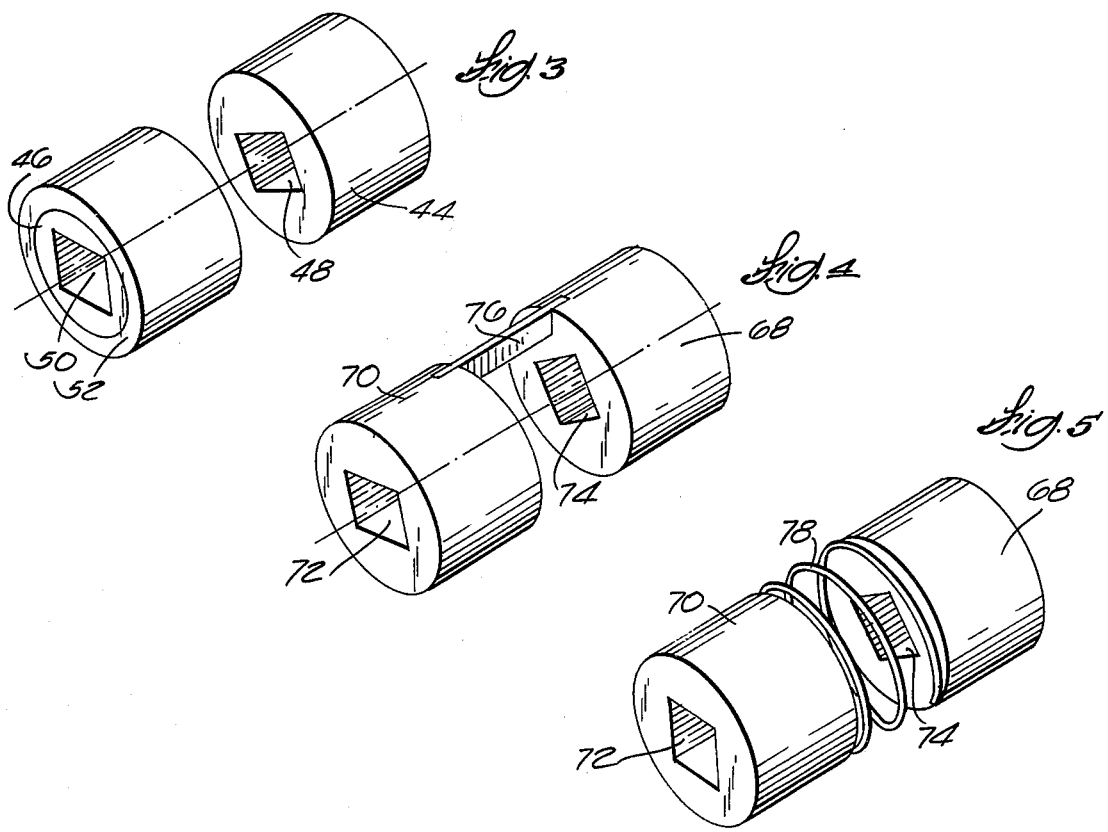

VARIABLE SPEED POWER TRANSMISSION INCLUDING MEANS FOR MINIMIZING BACKLASH

BACKGROUND OF THE INVENTION

The invention relates to power transmission and, more particularly, to variable speed, V-belt power transmissions.

Variable speed, V-belt power transmissions are used quite extensively in all-terrain vehicles, golf carts, small trucks and snowmobiles. Such transmissions include a movable sheave member which is mounted on the driving portion of an input shaft for common rotary movement with the input shaft and for relative axial movement on the driving portion of the input shaft. This movement of the movable sheave member usually is accomplished by providing the driving portion of the input shaft with external splines and the movable sheave member with an internally splined portion or by providing the driving portion of the input shaft with a polygonal cross sectional shape, such as a square or hexagonal shape, and the movable sheave member with a driven portion having a corresponding shape. With either of these arrangements, manufacturing tolerences result in some circumferential play between the driven surfaces of the movable sheave member and the driving surfaces of the shaft driving portion causing a backlashing of the movable sheave member, i.e., oscillatory rotation of the movable sheave member relative to the input shaft, particularly when the input shaft is driven by a two- or four-cycle internal combustion engine which inherently imparts a cyclical torque on the input shaft. This backlashing is particularly prevalent when such engines are operating at idling speed or under low load conditions and, not only increases the rattling noise created by the movable sheave member, but also causes considerable wear of various components.

SUMMARY OF THE INVENTION

The invention provides a power transmission having a movable sheave member mounted on an input shaft and including a simple arrangement for imposing a predetermined "locked-up" torque between driven surfaces of the movable sheave member and driving surfaces of the input shaft.

More specifically, the invention provides a power transmission including an input shaft having a driving portion, a fixed member affixed on the shaft and having a flange, a movable member having a flange and a hub having a bore, drive means carried by the hub bore mounting the movable sheave on the shaft driving portion with the flanges of the fixed and movable members in facing relationship for common rotation of the movable member with the shaft and for axial movement of the movable member on the shaft between a position spaced from the fixed member to provide a neutral drive condition and a position adjacent the fixed member to provide a power transmitting condition. The dirve means includes axially spaced first and second bushings, the first bushing being affixed on the bore of the movable member hub and each bushing having a central aperture which receives the shaft driving portion and has driven surfaces which are drivingly engaged by the shaft driving portion during rotation of the input shaft by a power source, and means for resiliently urging the second bushing rotationally relative to the first bushing, whereby portions of the driven surfaces of the first and second bushings apply a predetermined "locked-up" torque on the shaft driving portion to thereby minimize backlash between the movable member and the shaft driving portion.

In one embodiment, the outer surface of the second bushing is spaced from the bore of the movable member hub to define an annular spacing therebetween and the resilient urging means comprises an annular elastomeric member disposed in this annular spacing, which elastomeric member has an inner surface bonded to the outer surface of the second bushing and an outer surface bonded to the hub bore. This permits the first bushing to be rotated relative to the second bushing in a direction opposite to the direction of shaft rotation, by virtue of the resilient characteristic of the elastomeric member, during mounting of the movable member on the shaft driving portion. After the movable member has been mounted, the driven surfaces of the bushings impart a predetermined locked-up torque on the shaft driving portion in the direction of shaft rotation. In this embodiment, the shaft driving portion can be provided with a polygonal cross sectional shape, the apertures of the bushings provided with a corresponding shape, and the bushings located so that the aperture of the second bushing is rotationally offset from the aperture of the first bushing prior to mounting of the movable sheave member on the shaft driving portion.

In another embodiment, the second bushing is mounted for rotation relative to the bore of the movable member hub and the two bushings are connected together by a torsion spring means. As with the embodiment described in the preceding paragraph, the shaft driving portion can be provided with a polygonal cross sectional shape, the apertures of the bushings provided with a corresponding shape, and the bushings located so that the aperture of the second bushing is rotationally offset from the aperture of the first bushing prior to mounting of the movable sheave member on the input shaft driving portion.

One of the principal features of the invention is the provision of a power transmission including a simple arrangement for minimzing the backlash between an axially shiftable or movable sheave member of a V-belt transmission and an input shaft on which the movable sheave member is mounted for common rotary movement and for relative axial movement.

Another of the principal features of the invention is the provision of such an arrangement which is capable of minimizing backlash without requiring adjustment over the design life of the power transmission.

Still another of the principal features of the invention is the provision of a V-belt power transmission having a movable sheave member mounted on an input shaft for common rotary movement and for relative axial movement and drive means carried by the movable sheave member for resiliently and rotationally urging driven surfaces of the drive means into engagement with driving surfaces of the input shaft in the direction of shaft rotation.

Various other features, aspects and advantages of the invention will become apparent upon reviewing the following detailed description, the drawing, and the appended claims.

BRIEF DESCRIPTION OF THE DRAWINGS

FIG. 1 is a fragmentary, sectional side elevational view of one embodiment of a power transmission embodying various of the features of the invention, showing the movable member in the position when the transmission is in an idle or non-driving condition.

FIG. 2 is a sectional view taken along the line 2-2 in FIG. 1.

FIG. 3 is a perspective view of the drive bushings employed in the power transmission shown in FIG. 1, showing the relative rotaional position of the drive bushings prior to installation of the movable sheave member on the input shaft.

FIG. 4 is a perspective view similar to FIG. 2 showing an alternate construction for the drive bushings.

FIG. 5 is a perspective view similar to FIG. 2 showing another alternate construction for the drive bushings.

Before explaining the illustrated embodiments of the invention in detail, it is to be understood that the invention is not limited in its application to the details of construction and the arrangements of the components set forth in the following description or illustrated in the drawing. The invention is capable of other embodiments and of being practiced and carried out in various ways. Also, it is to be understood that the phraseology and terminology employed herein is for the purpose of description and should not be regarded as limiting.

GENERAL DESCRIPTION

Illustrated fragmentarily in FIG. 1 is a variable speed, V-belt power transmission 10 including a power input shaft 12 having one end 14 adapted to be connected to a suitable power source (not shown) and a driving portion 16. Fixedly mounted on the input shaft 12 is a fixed sheave member 18 including an inclined flange 20 extending radially from the input shaft 12.

Carried on the driving portion 16 of the input shaft 12 for common rotary movement and for relative axial movement is a movable sheave member 22 including a hub 24 having a bore 26 carrying drive means to be described hereinafter, which drive means is drivingly engaged by the driving portion 16 of the input shaft 12. While the driving portion 16 of the input shaft 12 can have various arrangements which facilitate this movement of the movable sheave member 22, including external splines, in the specific construction illustrated, the driving portion 16 has a square cross section. It should be understood that this driving portion 16 can also have other polygonal cross sectional shapes, such as triangular, pentagonal, hexagonal, etc.

The hub 24 includes a sleeve 28 which extends towards the fixed sheave member 18 (i.e., to the left as viewed in FIG. 1) and defines an annular pocket 30 which is open in the direction of the fixed sheave member 18. Extending from the hub 24 for common movement therewith is a radially inclined flange 32 which is located in facing relationship to the flange 20 of the fixed sheave member 18. The flange 32, together with the movable sheave member 22 as a whole, is movable relative to the fixed sheave member 18 between a neutral or spaced position in FIG. 1 and a drive position adjacent the fixed sheave member 20 (moved to the left as shown by the dashed line in FIG. 1). When the movable sheave member 22 is in the drive position, the power transmission assembly 10 is in a driving condition with the flanges 20 and 32 in driving engagement with a V-shaped transmission belt (not shown).

The movable sheave member 22 is biased towards the neutral or spaced position by a helical compression spring 34 which is located with one end seated against the annular pocket 30 and the other end seated against a spring stop 36 extending from the input shaft 12. The movable sheave member 22 is urged towards the drive position in response to rotation of the input shaft 12 by any suitable means. In the illustrated construction, such means comprises a garter spring 38 which encircles the hub 24 and which in response to the rotation of the movable sheave member 22 moves radially outwardly by centrifugal force. As the garter spring 38 moves radially, it engages a spring retainer or housing 40 which is fixed to the input shaft 12. The housing 40 is arranged to cause the garter spring 38 to be displaced towards the fixed sheave member 22 and to drivingly engage a portion 42 of the movable sheave member 22 so as to displace the movable sheave member 22 towards a drive position.

Due to manufacturing tolerances, there ordinarily is some circumferential play between the driving surfaces of the driving portion 16 of the input shaft 12 and the driven surfaces of the driving means carried by the hub bore 26. This circumferential play permits some backlashing of the movable sheave member 22 relative to the driving portion 16 of the input shaft 22, i.e., oscillatory rotation of the movable sheave member 22 relative to the driving portion 16 of the input shaft 12. The backlashing problem is particularly prevalent when the input shaft is driven by a two- or four-cycle internal combustion engine which inherently imparts a cyclical torque on the input shaft 12, particularly when operating at idling speeds or under low load conditions. This backlashing not only increases the rattling noise created by the movable sheave member 22, but also causes considerable wear of various components.

This backlashing problem is minimized by providing the movable sheave member 22 with drive means arranged such that the driven surfaces thereof apply a predetermined amount of torque on the driving surfaces of the driving portion 16 of the input shaft 12 in the direction of shaft rotation. More specifically, such drive means includes a pair of axially spaced drive bushings 44 and 46 carried by the hub bore 26. The drive bushings 44 and 46 have respective central apertures 48 and 50 which slidably receive the driving portion 16 of the input shaft 12 for common rotary movement and for relative axial movement of the movable sheave member 22 and the driving portion 16 of the inner shaft 12. The drive means further includes means for resiliently urging one of the bushings 44 and 46 rotationally relative to the other in the direction of shaft rotation.

While various arrangements can be used, in the specific construction illustrated in FIGS. 1-3, the drive bushing apertures 48 and 50 are square shaped and have an inside dimension closely approximating the outer dimension of the driving portion 16 of the input shaft 12. One drive bushing 44 is affixed to the hub bore 26 of the movable sheave member 22 and can be formed as an integral part of the hub bore if desired. The other drive bushing 46 has an outer dimension smaller than the hub bore 26 so there is an annular spacing between the drive bushing 46 and the hub bore 26. Disposed in this annular spacing is an annular elastomeric member 52 having an inner surface 54 bonded to the outer surface 55 of the drive bushing 46 and an outer surface 56 bonded to the hub bore 26.

Reference is made to the FIG. 3 which is a perspective view showing the relative position of the drive bushings 44 and 46 after assembly on the movable sheave member 22 but prior to installation of the movable sheave member 22 on the input shaft 12. As shown, the drive bushing 46 is located so that its aperture 50 is rotationally offset from the aperture 48 of the drive bushing 44. During installation of the movable sheave member 22, the drive bushing 46 is first slipped over the outer end 58 of driving portion 16 of the input shaft 12 and moved to the left as viewed in FIG. 1. Assuming that the input shaft 12 normally rotates in a clockwise direction as viewed from the outer end 58 of the input shaft 12, the movable sheave member 22 thereafter is rotated counterclockwise relative to the input shaft 12 until the aperture 48 of the drive bushing 44 is aligned with the driving portion 16 of the input shaft 12 so that the movable sheave member 22 can be moved into place on the driving portion 16 of the input shaft 12.

The resilient or flexible characteristic of the elastomeric member 52 permits this relative rotation of the drive bushings 44 and 46 during installation of the movable sheave member 22 and thereafter acts as a torsion spring causing the drive bushings to apply a torque on the driving portion 16 of the input shaft 12 in the direction of shaft rotation. In other words, the resultant "locked-up" torque between the drive bushings 44 and 46 causes portions of the driven surfaces, e.g., surfaces 60 and 62 (FIG. 2), of the drive bushing apertures 48 and 50 to be resiliently urged into engagement with portions of the driving surfaces, e.g., surfaces 64 and 66 (FIG. 2), of the driving portion 16 of the input shaft 12. Thus, no backlash will exist between the movable sheave member 22 and the driving portion 16 of the input shaft 12 so long as this torque is not exceeded.

The degree of rotational offset between the apertures 48 and 50 of the drive bushings 44 and 46 depends upon the flexibility of the elastomeric member 52 and the amount of circumferential play or lash between the drive bushing apertures 48 and 50 and the driving portion 16 of the input shaft 12 to be compensated for. This rotational offset generally will be less than 45°.

One of the particularly advantageous aspects of this arrangement is that the degree of rotational offset and/or the flexibility of the elastomeric member 52 can easily be adjusted so as to provide the torque required to substantially eliminate backlash, even after normal wear of the driven surfaces of the drive bushings and the driving surfaces of the driving portion of the input shaft, over the design life of the power transmission. Thus, there is no need for adjustment.

In the alternate constructions illustrated in FIGS. 4 and 5, which are perspective views similar to FIG. 3, one of the drive bushings 68 is rigidly affixed to the hub bore 26 (can be formed as an integral part of the hub bore 26 if desired) and the other drive bushing 70 is mounted for rotational movement relative to the hub bore 26. Prior to installation of the movable sheave member 22 on the driving portion 16 of the input shaft 12, the aperture 72 of the drive bushing 70 is rotationally offset from the aperture 74 of the drive bushing 68 in the same manner as described above for both of these alternate constructions.

In the construction illustrated in FIG. 4, the drive bushings 68 and 70 are connected together by a cantilever spring 76 which is affixed at the opposite ends to the drive bushings 68 and 70. In the construction illustrated in FIG. 5, the drive bushings 68 and 70 are connected together by a spirally wound torsion spring 78 which is affixed at the opposite ends to the bushings 68 and 70 and encircles the driving portion 16 of the input shaft after 12 the movable sheave member 22 is installed thereon. As the movable sheave member 22 is mounted on the driving portion 16 of the input shaft 12 in the same manner described above, the cantilever spring 76 of the construction illustrated in FIG. 4 is twisted and the torsion spring 78 of the construction illustrated in FIG. 5 is unwound. After installation of the movable sheave member 22 has been completed, these springs impose a torsional force between the drive bushings 68 and 70 and cause the drive bushings to apply a "locked-up" torque on the driving portion 16 of the input shaft 12 in the same manner described above.

While the invention has been described with the shaft driving portion and the apertures of the drive bushings having a polygonal shape, it should be understood that the invention can be used with an input shaft having an externally splined driving portion and each of the drive bushings having an internally splined aperture. In this case, the rotationally movable drive bushing is installed on the driving portion of the input shaft first and the movable sheave member thereafter is rotated in a direction opposite to the direction of shaft rotation prior to moving the fixed drive bushing onto the driving portion of the input shaft so as to create the locked-up torque condition described above.

Various of the features of the invention are set forth in the following claims.

What is claimed is:

1. A power transmission comprising a shaft adapted for connection to a power source and having a driving portion, a fixed member affixed on said shaft and having a flange, a movable member having a flange and a hub having a bore, drive means carried by said hub bore mounting said movable member on said shaft driving portion with said flanges of said fixed and movable members in facing relationship for common rotation of said movable member with said shaft and for axial movement of said movable member on said shaft between a position spaced from said fixed member to provide a neutral drive condition and a position adjacent said fixed member to provide a power transmitting condition, said drive means comprising axially spaced first and second bushings each having a central aperture which receives said shaft driving portion and has driven surfaces which are drivingly engaged by said shaft driving portion during rotation of said shaft by said power source, said first bushing being affixed to said hub bore, and means for resiliently urging said second bushing rotationally relative to said first bushing, whereby portions of said driven surfaces of said first and second bushings apply a predetermined torque on said shaft driving portion to thereby minimize backlash between said movable member and said shaft driving portion, biasing means urging said movable member toward said spaced position, and means operable in response to rotation of said shaft for overpowering said biasing means and moving said movable member to said adjacent position.

2. A power transmission according to claim 1 wherein said second bushing has an outer surface which is spaced from said hub bore to define an annular spacing therebetween, and said resilient urging means comprises an annular elastomeric member disposed in said annular spacing, said elastomeric member having an inner surface bonded to the outer surface of said second bushing and an outer surface bonded to said hub bore such that, during installation of said movable member on said shaft driving portion and after said second bushing has been installed on said shaft driving portion, said movable member can be rotated in a direction opposite to the direction of shaft rotation prior to installing said first bushing on said shaft driving portion so as to rotate said first bushing relative to said second bushing and said driven surfaces of said bushings impart a predetermined locked-up torque on said shaft driving portion in the direction of shaft rotation after installation of said movable member has been completed.

3. A power transmission according to claim 2 wherein said shaft driving portion has a polygonal cross section and said apertures of said first and second bushings have a corresponding shape and said second bushing aperture is rotationally offset from said first bushing aperture prior to mounting of said movable member on said shaft driving portion.

4. A power transmission according to claim 1 wherein said second bushing is mounted for rotational movement relative to said hub and said first and second bushings are connected together by a torsion spring means such that, during installation of said movable member on said shaft driving portion and after second bushing has been installed on said shaft driving portion, said movable shaft can be rotated in a direction opposite to the direction of shaft rotation prior to installing said first bushing on said shaft driving portion so as to rotate said first bushing relative to said second bushing and said driven surfaces of said bushings impart a predetermined locked-up torque on said shaft driving portion in the direction of shaft rotation after installation of said movable member has been completed.

5. A power transmission according to claim 4 wherein said spring means is a cantilever spring affixed at the opposite ends to said first and second bushings.

6. A power transmission according to claim 4 wherein said spring means is a spirally wound spring affixed at the opposite ends to said first and second bushings and adapted to encircle said shaft driving portion.

7. A power transmission according to claim 1 wherein said shaft driving portion has a polygonal cross section and said apertures of said first and second bushings have a corresponding shape, said second bushing is mounted for rotational movement relative to said hub, and said resilient urging means comprises a torsion spring means connected between first and second bushings with said second bushing aperture being rotationally offset from said first bushing aperture prior to mounting said movable member on said shaft driving portion.

8. A power transmission according to claim 6 wherein said spring means is a cantilever spring affixed at the opposite ends to said first and second bushings.

9. A power transmission according to claim 6 wherein said spring means is a spirally wound torsion spring affixed at the opposite ends to said first and second bushings and adapted to encircle said shaft driving portion.

* * * * *